United States Patent
Hooli et al.

(10) Patent No.: US 11,659,557 B2
(45) Date of Patent: *May 23, 2023

(54) WIRELESS DEVICE CAPABLE OF TRANSMITTING UPLINK SOUNDING REFERENCE SIGNALS

(71) Applicant: WIRELESS FUTURE TECHNOLOGIES INC., Ottawa (CA)

(72) Inventors: Kari Juhani Hooli, Oulu (FI); Ajit Kahaduwe, Marietta, GA (US); Timo Erkki Lunttila, Espoo (FI); Karri Markus Ranta-Aho, Atlanta, GA (US); Antti Anton Toskala, Espoo (FI)

(73) Assignee: WIRELESS FUTURE TECHNOLOGIES INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,088

(22) Filed: Aug. 3, 2021

(65) Prior Publication Data

US 2022/0007357 A1    Jan. 6, 2022

Related U.S. Application Data

(63) Continuation of application No. 15/930,037, filed on May 12, 2020, now Pat. No. 11,082,959, which is a
(Continued)

(51) Int. Cl.
*H04W 72/04* (2023.01)
*H04W 72/12* (2023.01)

(52) U.S. Cl.
CPC ... *H04W 72/0413* (2013.01); *H04W 72/0406* (2013.01); *H04W 72/1278* (2013.01)

(58) Field of Classification Search
CPC . H04W 72/00; H04W 72/04; H04W 72/0406; H04W 72/0413; H04W 72/042;
(Continued)

(56) References Cited

U.S. PATENT DOCUMENTS 5,508,708 A  4/1996 Ghosh et al.
5,903,844 A  5/1999 Bruckert et al.
(Continued)

FOREIGN PATENT DOCUMENTS

WO   01/89254    11/2001
WO   02/50563    6/2002
(Continued)

OTHER PUBLICATIONS

NPL Search.*

(Continued)

*Primary Examiner* — Van T Trieu
(74) *Attorney, Agent, or Firm* — Volpe Koenig (57) ABSTRACT

A user equipment (UE) is disclosed. The UE includes a receiver and a processor that receive a radio resource control (RRC) signal including uplink (UL) sounding reference signal (SRS) configuration information. The UE also receives a semi-persistent scheduling (SPS) message to activate transmission of UL SRSs The UE may then transmit UL SRSs in a time and frequency pattern based on at least the UL SRS configuration information. A UE method and an eNode-B are also disclosed.

18 Claims, 5 Drawing Sheets

Related U.S. Application Data continuation of application No. 16/259,684, filed on Jan. 28, 2019, now Pat. No. 10,652,869, which is a continuation of application No. 15/894,469, filed on Feb. 12, 2018, now Pat. No. 10,194,431, which is a continuation of application No. 15/063,161, filed on Mar. 7, 2016, now Pat. No. 9,894,482, which is a continuation of application No. 14/337,988, filed on Jul. 22, 2014, now Pat. No. 9,282,546, which is a continuation of application No. 13/128,151, filed as application No. PCT/IB2009/054948 on Nov. 6, 2009, now Pat. No. 8,810,393.

(60) Provisional application No. 61/198,632, filed on Nov. 6, 2008.

(58) Field of Classification Search
CPC ........... H04W 72/127; H04W 72/1284; H04W 72/1289; H04L 1/1864; H04L 1/1858; H04J 11/003; H04J 11/0036; H04J 11/005
See application file for complete search history.

(56) References Cited

U.S. PATENT DOCUMENTS

| | | | |
|---|---|---|---|
| 8,072,918 B2 * | 12/2011 | Muharemovic ... | H04W 72/0426 370/329 |
| 8,218,526 B2 * | 7/2012 | Bertrand ........... | H04W 56/0005 370/350 |
| 8,295,236 B2 | 10/2012 | Ishii et al. | |
| 8,537,876 B2 | 9/2013 | Hooli et al. | |
| 8,619,684 B2 | 12/2013 | Meylan et al. | |
| 8,625,724 B2 | 1/2014 | Song et al. | |
| 8,761,195 B2 | 6/2014 | Tiirola et al. | |
| 8,787,273 B2 | 7/2014 | Ishii | |
| 8,891,418 B2 | 11/2014 | Suzuki et al. | |
| 9,019,983 B2 | 4/2015 | Maeda et al. | |
| 9,635,656 B2 | 4/2017 | Maeda et al. | |
| 9,893,859 B2 | 2/2018 | Bertrand et al. | |
| 2001/0022558 A1 | 9/2001 | Karr et al. | |
| 2006/0293066 A1 | 12/2006 | Edge et al. | |
| 2007/0155401 A1 | 7/2007 | Ward et al. | |
| 2008/0207357 A1 | 8/2008 | Savarese et al. | |
| 2008/0280625 A1 | 11/2008 | Larsen | |
| 2009/0046645 A1 | 2/2009 | Bertrand et al. | |
| 2009/0239568 A1 * | 9/2009 | Bertrand ........... | H04W 52/0225 455/522 |
| 2010/0098012 A1 | 4/2010 | Bala et al. | |
| 2010/0232488 A1 | 9/2010 | Song et al. | |
| 2014/0113639 A1 | 4/2014 | Nakasato | |

FOREIGN PATENT DOCUMENTS

| | | |
|---|---|---|
| WO | 07/031844 | 3/2007 |
| WO | 08/120925 | 10/2008 |

OTHER PUBLICATIONS

Samsung, "PUCCH handling during DRX," 3GPP TSG-RAN2 Meeting #61 bis, R2-081533, Shenzhen, China (Mar. 31-Apr. 4, 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.6.0 (Sep. 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.10.0 (Sep. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.1.0 (Sep. 2009).

* cited by examiner

WIRELESS DEVICE CAPABLE OF TRANSMITTING UPLINK SOUNDING REFERENCE SIGNALS

CROSS REFERENCE TO RELATED APPLICATIONS

This application is a continuation of U.S. patent application Ser. No. 15/930,037 filed May 12, 2020, which is a continuation of U.S. patent application Ser. No. 16/259,684 filed Jan. 28, 2019, which issued on May 12, 2020 as U.S. Pat. No. 10,652,869, which is a continuation of U.S. patent application Ser. No. 15/894,469, filed Feb. 12, 2018, which issued Jan. 29, 2019 as U.S. Pat. No. 10,194,431, which is a continuation of U.S. patent application Ser. No. 15/063,161, filed Mar. 7, 2016, which issued on Feb. 13, 2018, as U.S. Pat. No. 9,894,482, which is a continuation of U.S. patent application Ser. No. 14/337,988, filed Jul. 22, 2014, which issued on Mar. 8, 2016, as U.S. Pat. No. 9,282,546, which is a continuation of U.S. patent application Ser. No. 13/128,151, filed Jun. 14, 2011, which issued on Aug. 19, 2014 as U.S. Pat. No. 8,810,393, which claims the benefit of 371 International Application No. PCT/IB2009/054948, filed Nov. 6, 2009, which claims the benefit of U.S. Provisional Application Ser. No. 61/198,632, filed Nov. 6, 2008, which are incorporated by reference as if fully set forth.

TECHNICAL FIELD

The exemplary and non-limiting embodiments of this invention relate generally to wireless communication systems, methods, devices and computer programs and, more specifically, relate to determining location information for a wireless device.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
A-FLT advanced forward link trilateration
BSR buffer status report
CQI channel quality indicator
DL downlink (eNB towards UE)
DM RS demodulation reference signal
eNB EUTRAN Node B (evolved Node B)
E-OTD enhanced observed time difference
EPC evolved packet core
E-UTRAN evolved UTRAN (LTE)
FCC Federal Communications Commission
GPS global positioning system
GSM global system mobile
LCS location services
LE locating entity
LMU locationing measurement unit
LTE long term evolution
MAC medium access control
MM/MME mobility management/mobility management entity
Node B base station (also eNB)
O&M operations and maintenance
OFDMA orthogonal frequency division multiple access
PDCP packet data convergence protocol
PHY physical
PRACH physical random access channel
PUSCH physical uplink shared channel
RLC radio link control
RRC radio resource control
SC-FDMA single carrier, frequency division multiple access
S-GW serving gateway
SPS semi-persistent scheduling
SRS sounding reference signal
TTI transmission time interval
UE user equipment
UL uplink (UE towards eNB)
U-TDOA uplink time difference of arrival
UTRAN universal terrestrial radio access network
WCDMA wideband code division multiple access A communication system known as evolved UTRAN (E-UTRAN, also referred to as UTRAN-LTE or as E-UTRA) is currently under development within the 3GPP. As presently specified the DL access technique will be OFDMA, and the UL access technique will be SC-FDMA.

One specification of interest is 3GPP TS 36.300, V8.6.0 (2008-09), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), incorporated by reference herein in its entirety.

Figure 1:
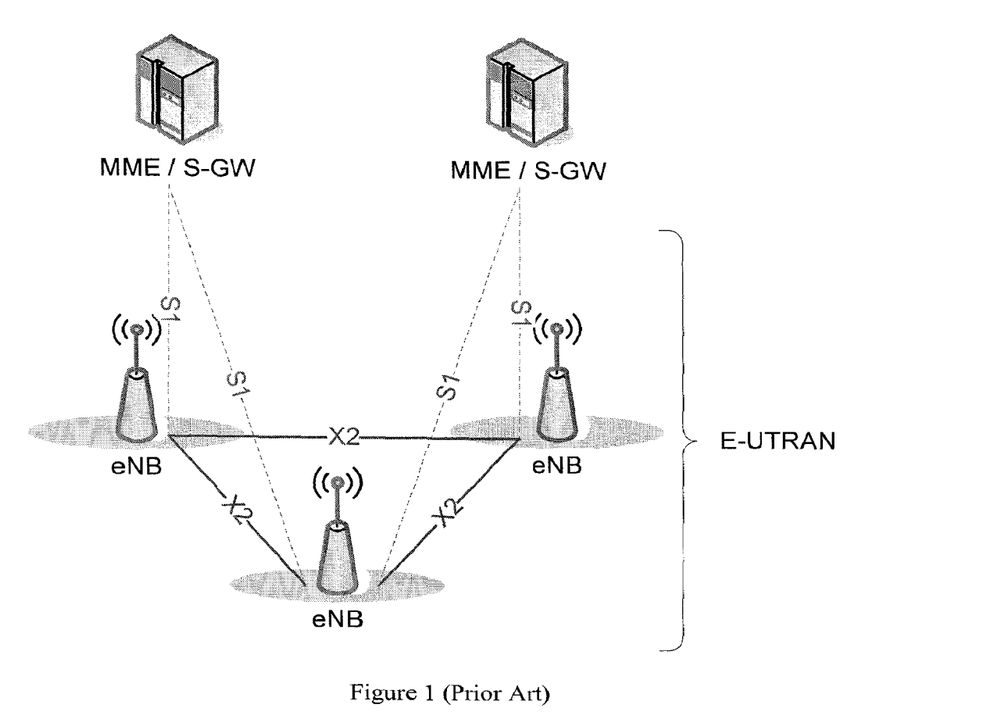
FIG. 1 reproduces FIG. 4 of 3GPP TS 36.300, and shows the overall architecture of the E UTRAN system.

FIG. 1 reproduces FIG. 4.1 of 3GPP TS 36.300, and shows the overall architecture of the E-UTRAN system. The EUTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (S-GW) by means of a S1 interface. The S1 interface supports a many to many relationship between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of the user data stream;
selection of a MME at UE attachment;
routing of User Plane data towards the Serving Gateway;
scheduling and transmission of paging messages (originated from the MME);
scheduling and transmission of broadcast information (originated from the MME or O&M); and
a measurement and measurement reporting configuration for mobility and scheduling.

The technology to locate mobile devices is gaining ground and the development of these technologies is in part driven by the United States Federal Communications Commission (FCC) emergency call requirements, where a terminal placing an emergency call must be positioned with a 67% probability within 50 meters and with a 95% probability within 150 meters. A GPS system could provide such accuracies when the satellites are visible to the receiver, but in indoor/urban environments the probability of determining a GPS position is not high enough to meet the requirement and additional solutions are needed.

DETAILED DESCRIPTION

A network based trilateration solution, where the uplink transmission of the terminal is measured by at least three different measurement unit having an accurate time reference, offers reasonably good accuracy in city areas where the cell sizes are small and the uplink transmission may be detected by multiple measurement units (typically co-located with or even integrated to base stations). Thus, a hybrid solution combining multiple positioning techniques (e.g., network based trilateration and GPS) may meet the FCC emergency call requirements.

Uplink time difference of arrival (U-TDOA) is based on the reception of a transmission from a terminal by multiple sites (regardless of possible macro-diversity). In some systems, a signal processing means may be used to dig out the signal from the interference (e.g., using post-processing). There are a number of potential interference sources, for example other mobile devices.

In UTRAN LTE and SC-FDMA systems, an uplink resource may be controlled by one cell. The uplink resource allocation may vary both in time and frequency domains, e.g., a locationing measurement unit (LMU) may have difficulties in detecting signals from terminals. This may be due to: 1) There is no similar user identification based on the spreading (scrambling) code; and/or 2) There is no information outside the serving cell which allocated resources to the UE. Thus, the lack of proper information complicates the task of making location measurements.

In order to provide cellular network based trilateration positioning technique to a specific radio access technology two problems need to be overcome: 1) the uplink transmission characteristics of the terminal being positioned need to be known in advance by the participating LMUs; and 2) at least three LMUs must be able to detect the signal of the terminal being positioned and measure the received signal timing relative to a common (and accurate) time reference (e.g., a GPS time).

Based on the received time differences and the known locations of the LMUs the location of the terminal being positioned may be calculated.

Exemplary embodiments in accordance with this invention are related to the use of an uplink time difference of arrival (U-TDOA) location positioning method, for example as a part of eUTRAN. The U-TDOA may be based on an uplink measurements made in coordination with LMUs. Exemplary embodiments in accordance with this invention may make use of U-TDOA with uplink multiple access, e.g., SC-FDMA. Additionally, exemplary embodiments in accordance with this invention may be used in cooperation with enhanced observed time difference (E-OTD) techniques.

Figure 2:
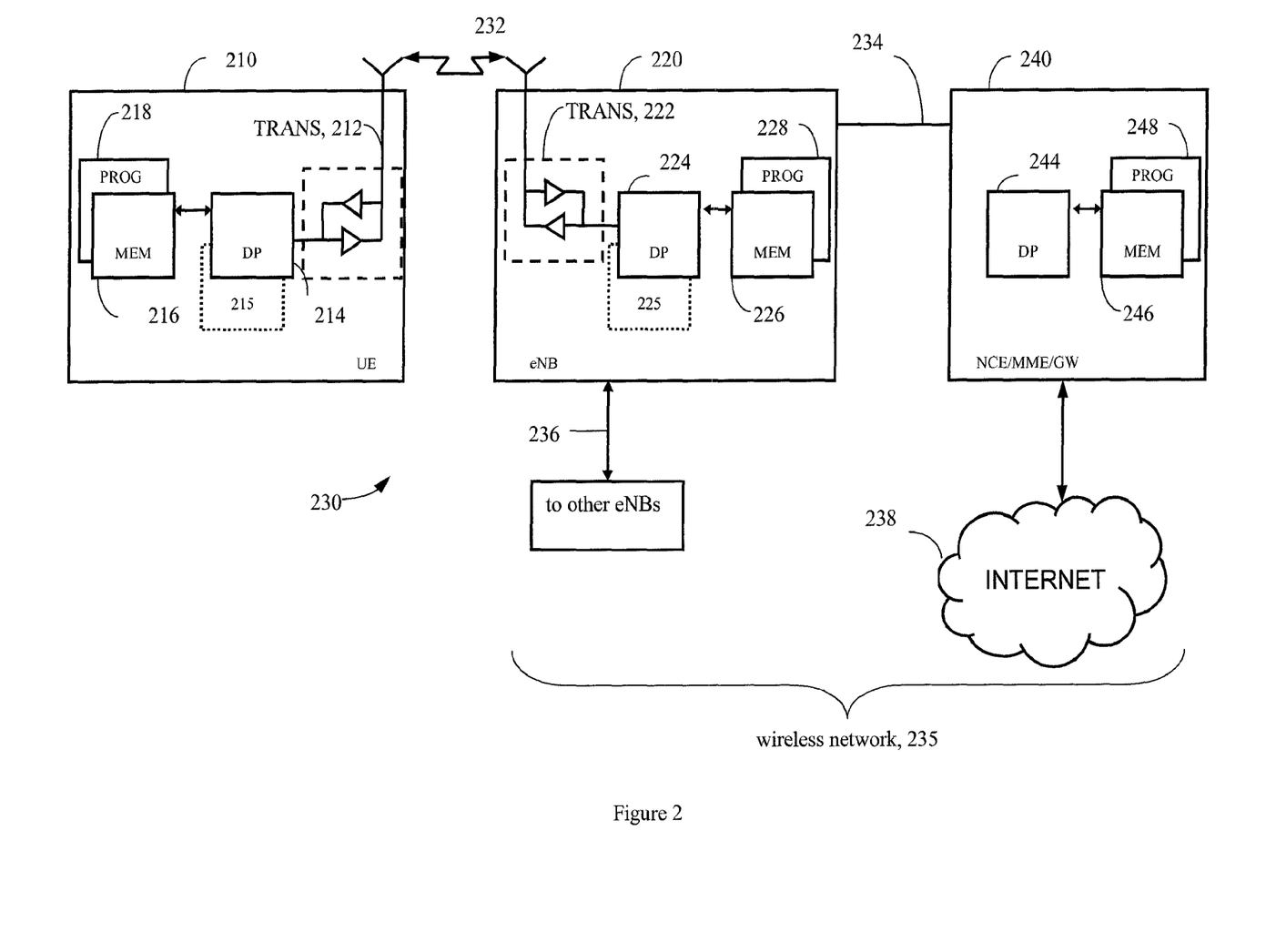
FIG. 2 shows a simplified block diagram of various exemplary electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention.

In FIG. 2 a wireless network 235 is adapted for communication over a wireless link 232 with an apparatus, such as a mobile communication device which may be referred to as a UE 210, via a network access node, such as a Node B (e.g., a base station), and more specifically an eNB 220. The network 235 may include a network control element (NCE) 240 that may include the MME/S GW functionality shown in FIG. 1, and which provides connectivity with a network 235, such as a telephone network and/or a data communications network (e.g., the internet).

The UE 210 includes a controller, such as a computer or a data processor (DP) 214, a computer-readable memory medium embodied as a memory (MEM) 216 that stores a program of computer instructions (PROG) 218, and a suitable radio frequency (RF) transceiver 212 for bidirectional wireless communications with the eNB 220 via one or more antennas.

The eNB 220 also includes a controller, such as a computer or a data processor (DP) 224, a computer-readable memory medium embodied as a memory (MEM) 226 that stores a program of computer instructions (PROG) 228, and a suitable RF transceiver 222 for communication with the UE 210 via one or more antennas. The eNB 220 is coupled via a data/control path 234 to the NCE 240. The path 234 may be implemented as the S1 interface shown in FIG. 1. The eNB 220 may also be coupled to another eNB via data/control path 236, which may be implemented as the X2 interface shown in FIG. 1.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 214 of the UE 210; by the DP 224 of the eNB 220; and/or by the DP 244 of the eNB 240, or by hardware, or by a combination of software and hardware (and firmware).

The UE 210 and the eNB 220 may also include dedicated processors, for example processors 215 and processors 225.

In general, the various embodiments of the UE 210 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples.

Figure 3:
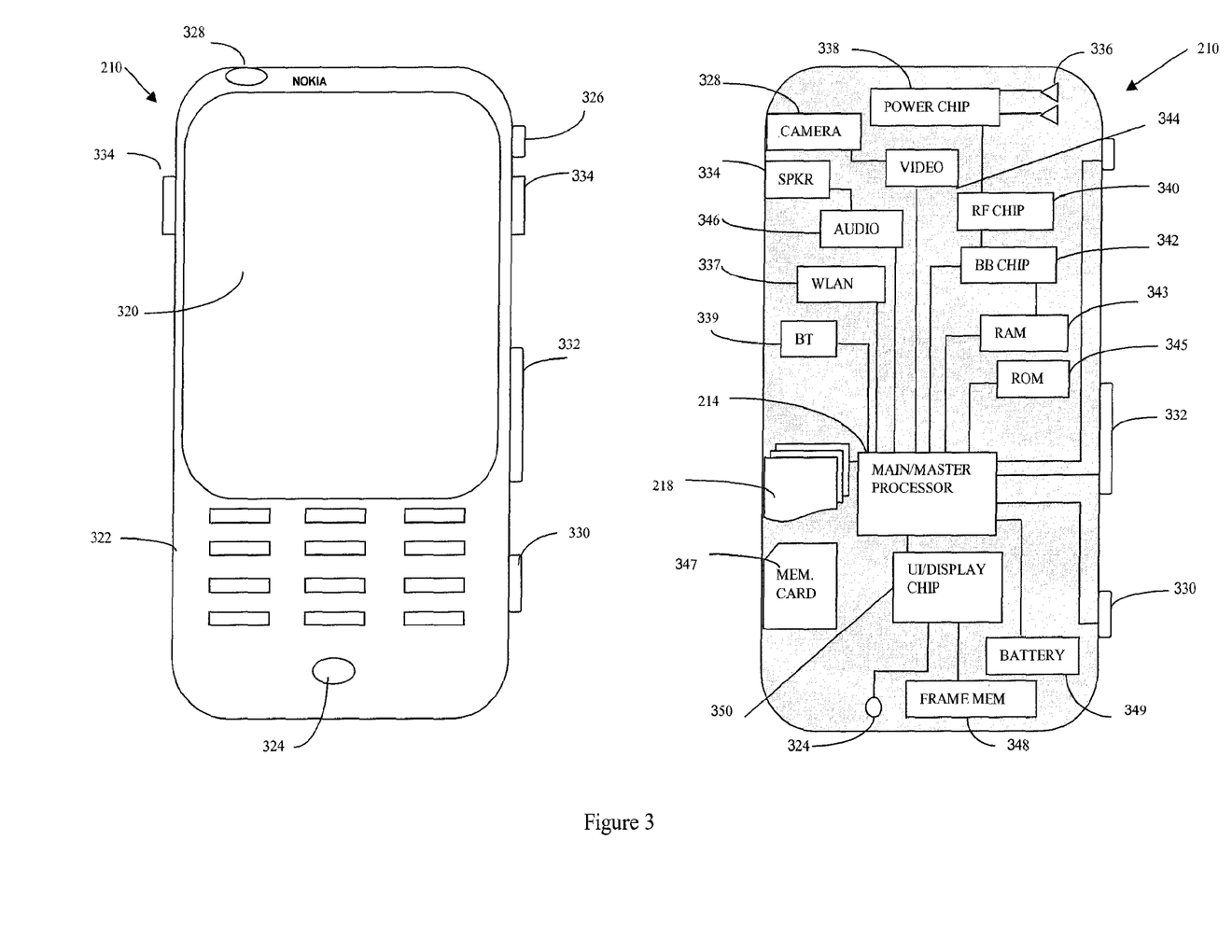
FIG. 3 shows a more particularized block diagram of an exemplary user equipment such as that shown at FIG. 2.

FIG. 3 illustrates further detail of an exemplary UE in both plan view (left) and sectional view (right), and the invention may be embodied in one or some combination of those more function-specific components. At FIG. 3 the UE 210 has a graphical display interface 320 and a user interface 322 illustrated as a keypad but understood as also encompassing touch-screen technology at the graphical display interface 320 and voice-recognition technology received at the microphone 324. A power actuator 326 controls the device being turned on and off by the user. The exemplary UE 210 may have a camera 328 which is shown as being forward facing (e.g., for video calls) but may alternatively or additionally be rearward facing (e.g., for capturing images and video for local storage). The camera 328 is controlled by a shutter actuator 330 and optionally by a zoom actuator 332 which may alternatively function as a volume adjustment for the speaker(s) 334 when the camera 328 is not in an active mode.

Within the sectional view of FIG. 3 are seen multiple transmit/receive antennas 336 that are typically used for cellular communication. The antennas 336 may be multi-band for use with other radios in the UE. The operable ground plane for the antennas 336 is shown by shading as spanning the entire space enclosed by the UE housing though in some embodiments the ground plane may be limited to a smaller area, such as disposed on a printed wiring board on which the power chip 338 is formed. The power chip 338 controls power amplification on the channels being transmitted and/or across the antennas that transmit simultaneously where spatial diversity is used, and amplifies the received signals. The power chip 338 outputs the amplified received signal to the radio-frequency (RF) chip 340 which demodulates and downconverts the signal for baseband processing. The baseband (BB) chip 342 detects the signal which is then converted to a bit-stream and finally decoded. Similar processing occurs in reverse for signals generated in the apparatus 210 and transmitted from it.

Signals to and from the camera 328 pass through an image/video processor 344 which encodes and decodes the various image frames. A separate audio processor 346 may also be present controlling signals to and from the speakers 334 and the microphone 324. The graphical display interface 320 is refreshed from a frame memory 348 as controlled by a user interface chip 350 which may process signals to and from the display interface 320 and/or additionally process user inputs from the keypad 322 and elsewhere.

Certain embodiments of the UE 210 may also include one or more secondary radios such as a wireless local area network radio WLAN 337 and a Bluetooth® radio 339, which may incorporate an antenna on-chip or be coupled to an off-chip antenna. Throughout the apparatus are various memories such as random access memory RAM 343, read only memory ROM 345, and in some embodiments removable memory such as the illustrated memory card 347. The various programs 218 are stored in one or more of these memories. All of these components within the UE 210 are normally powered by a portable power supply such as a battery 349.

The processors 338, 340, 342, 344, 346, 350, if embodied as separate entities in a UE 210 or eNB 220, may operate in a slave relationship to the main processor 214, 224, which may then be in a master relationship to them. Any or all of these various processors of FIG. 3 access one or more of the various memories, which may be on-chip with the processor or separate therefrom. Similar function-specific components that are directed toward communications over a network broader than a piconet (e.g., components 336, 338, 340, 342-345 and 347) may also be disposed in exemplary embodiments of the access node 220, which may have an array of tower-mounted antennas rather than the two shown at FIG. 3.

Note that the various chips (e.g., 338, 340, 342, etc.) that were described above may be combined into a fewer number than described and, in a most compact case, may all be embodied physically within a single chip.

In an exemplary embodiment in accordance with this invention, an eNode B sends (e.g. via the LE) information to an LMU regarding a resource pattern (e.g., in time, frequency and/or code domains) for a particular terminal. Alternatively, the LMU may be given the time slots when the terminal scheduled. The LE may use this information to coordinate additional LMUs for determining the location of the terminal.

When an eNB is made aware of the fact that a particular terminal is being positioned, for example by a locating entity (LE), the eNB orders the terminal to transmit a signal with assigned time and frequency characteristics (e.g., TTI, etc.). The signal characteristics the eNB assigns the terminal are also made known to LMUs trying to position the terminal.

In addition the eNB could instruction the terminal to boost the uplink transmission power in order to increase the probability that a sufficiently large number of LMUs detect and measure the timing of the terminal's uplink transmission.

A central entity, such as a locationing entity (LE) (e.g., a locationing server) instructs an eNB serving a terminal to be located to instruct the terminal to start transmitting a signal used in location measurements. The LE informs at least three LMUs to start seeking for and, if detected, measure the receive timing of the signal. The LMUs will report the measurements (e.g., the received timing relative to a common time reference, for example, GPS time) to a location calculation entity (e.g., the LE). The locations of the LMUs may be known and thus the position of the terminal being located can be calculated based on the time difference of the terminal's signal as observed by the LMUs.

Signal characteristics to be used for the signal to be detected by the LMUs may be pre-negotiated, assigned from the LE, or decided by the serving eNB and subsequently informed (e.g. via the LE) to the LMUs.

The resources (e.g., time-frequency resources) to use for positioning may be to communicate the parameters used in the configuration of the SRS or PRACH (using dedicated RRC signaling, broadcast signaling, etc.). If positioning based on a dynamically scheduled PUSCH or DM RS transmission is used, the exact frequency allocation, subframes as well as the DM RS cyclic shift may be signaled explicitly or use a predetermined value, in addition to the relevant serving eNB related parameters which may include, e.g., cell identity and parameters related to DM RS sequence group hopping, sequence hopping and sequence-shift pattern. The signaling of the parameters between eNBs could be done over the X2 air interface or via the backhaul network.

The serving eNB may command a UE to transmit a signal that is detectable, occurs relatively often and is of sufficient energy and duration for the LMUs to detect and measure its timing. That may be done by using uplink sounding reference symbols (UL SRS), which may be ordered to be sent periodically over a specific time duration sufficient for the LMUs to measure. Periodic UL SRS may be commanded on once, and off once, between these commands the terminal may autonomously transmit using known time and frequency characteristics. Alternatively, the eNB may indicate a duration for the transmission, avoiding transmitting an off command later.

If needed, the eNB could configure UL SRSs or simply turn UL SRSs off for other UEs in order to release sufficient UL SRS resources for the positioning. The UL SRS resources for the positioning may also be pre-determined.

Another possibility may be the usage of a dedicated PRACH preamble. The eNB may repeatedly order the UE to transmit a dedicated PRACH preamble on a PRACH channel (or channels). The eNB would send the dedicated PRACH preamble orders to the UE at times known to the LMUs. Also, other dedicated preamble parameters could be pre-negotiated with other LMUs (e.g., during initial setup).

The terminal may instead be scheduled to transmit a message at a predetermined time and frequency location. This message may include scheduling information or some other useful information, e.g., an aperiodic CQI report, a Buffer status report (BSR), a demodulation reference signal (DM RS) of a PUSCH transmission, etc.

In another exemplary embodiment in accordance with this invention, a new signal type could be defined for the locationing signal, e.g., on a pre-determined set of sub-frequency/frequencies. The signal could also be an existing signal that is reserved or re-defined solely for positioning. For example, the UE could send, when ordered, a predetermined PRACH preamble at a predetermined PRACH format using predetermined frequency resources and periodicity over a specific time duration. The relevant parameters could be predetermined relative to the PRACH parameters of the cell or assigned in a signal using absolute terms. A combination of the signaling mechanisms could also be utilized: e.g. with dedicated PRACH preambles and wideband SRS transmission allowing for a precise positioning estimate. Further, angle, or direction of arrival measurement of the UE signal at the LMU could also be utilized as a way to improve the positioning accuracy. This measurement could be used either alone or as a complementary mechanism with the U-TDOA methods to further improve positioning accuracy.

Semi-persistent scheduling (SPS) which defines a deterministic time and frequency transmission pattern may be used by the uplink transmission.

The serving eNB could also boost the uplink transmission power of the transmitted signal to enhance the probability that at least three LMUs can detect the signal. The uplink power control commands under the eNBs discretion may be used for this purpose.

Figure 4:
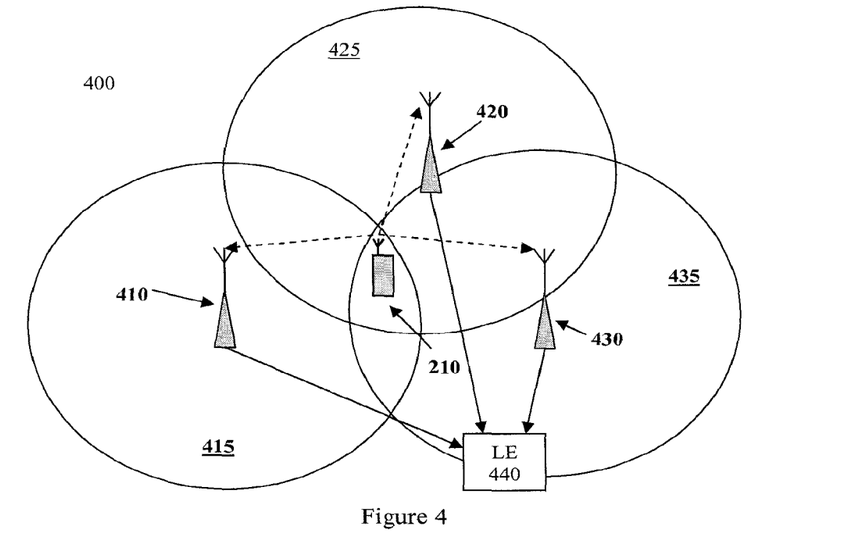
FIG. 4 illustrates a simplified diagram of a location determining system which includes various exemplary electronic devices that are suitable for use in practicing the exemplary embodiments of this invention.

FIG. 4 illustrates a simplified diagram of a location determining system 400 which includes various exemplary electronic devices that are suitable for use in practicing the exemplary embodiments of this invention. As shown, UE 210 is the mobile device which is having its location determined. LMUs 410, 420 and 430 (some of which may be integrated into eNBs) may detect signals in their respective areas (LMU 410 in area 415, LMU 420 in area 425, and LMU 430 in area 435). As show, UE 210 may transmit a signal which may be detected by LMUs 410, 420 and 430. LMUs 410, 420 and 430 may send the detected signal (and additional information, e.g., the location information for the LMU) to LE 440. LE 440 may be part of a LMU (including LMUs 410, 420 and 430), an eNB, an MME, etc.

Figure 5:
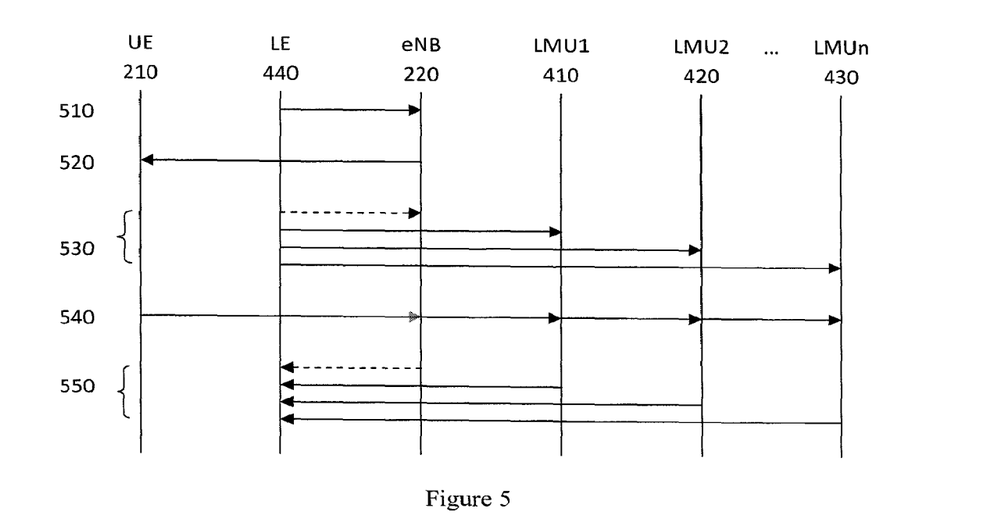
FIG. 5 depicts a simplified transmission diagram of an exemplary embodiment of this invention.

FIG. 5 depicts a simplified transmission diagram of an exemplary embodiment of this invention. As shown, UE 210 is served by eNB 220. At time 510, LE 440 instructs the eNB 220 to order the UE 210 to transmit a signal for LCS. These instructions may include an assignment of signal characteristics. Alternatively, eNB may determine the signal characteristics for the signal and inform the LE accordingly (not shown).

At time 520, the eNB 220 transmit orders to the UE 210. These orders may include an assignment of signal characteristics (e.g., specific parameters, reference to a predetermined signal characteristics, etc.).

At time 530, the LE 440 instructs at least three LMUs (e.g., 410, 420, 430) to search for a signal from the UE 210. These instructions may include the assigned signal characteristics. Additionally, eNB 220 may also search for the signal from the UE 210 (e.g., using an LMU located in eNB 220). The signaling performed at times 520 and 530 may occur in any timed order (e.g., 530 may occur before 520).

In response to receiving orders the UE 210 begins transmitting a signal at time 540. If signal characteristics are provided, then the signal may conform to those characteristics. LMU1 410, LMU2 420 . . . LMUn 430 (and even eNB 220) may then detect the signal from UE 210. Upon receiving the signal, the associated LMU may determine a U-TDOA based upon the assigned transmit time and the time of reception.

At time 550, LMU1 410, LMU2 420 . . . LMUn 430 (and even eNB 220) transmit information regarding the received signal (e.g., the U-TDOA information) to the LE 440. Additional location information or LMU identifying information may be sent at this time. Based upon the received signal information, the LE 440 may determine the location of the UE 210 (e.g., using geometric triangulation, A-FLT, etc.). Alternatively, a separate device may receive this information and determine the location of the UE 210.

Based on the foregoing it should be apparent that the exemplary embodiments of this invention provide a method, apparatus and computer program(s) to determining location information for a wireless device.

Figure 6:
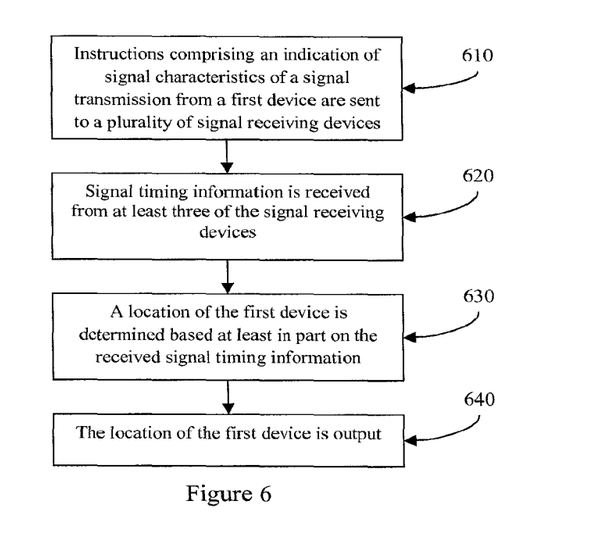
FIG. 6 is a logic flow diagram that illustrates the operation of a method, and a result of execution of computer program instructions, in accordance with the exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at block 610, instructions comprising an indication of signal characteristics of a locating signal from a first device (e.g., UE 210) are sent to a plurality of signal receiving devices (e.g., LMU1 410, LMU2 420, LMUn 430, etc.). Locating signal information is received from at least three of the signal receiving devices at block 620. At block 630, a location of the first device is determined based at least in part on the received locating signal information. Additionally, the location may be determined at least in part on the signal characteristics (e.g., allocated time domain characteristics). The location of the first device is output at block 640.

Figure 7:
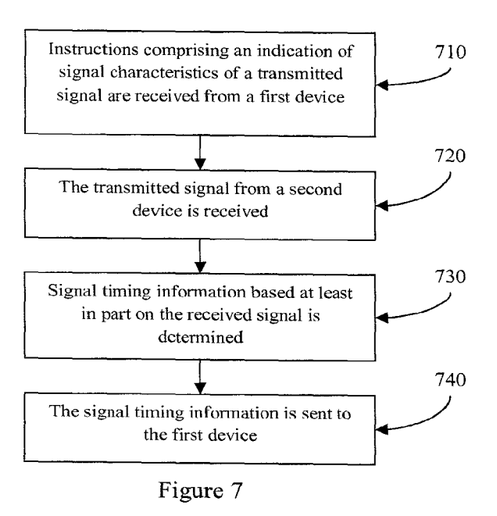
FIG. 7 is a logic flow diagram that illustrates the operation of another method, and a result of execution of computer program instructions, in accordance with the exemplary embodiments of this invention.

FIG. 7 is a logic flow diagram that illustrates the operation of another method, and a result of execution of computer program instructions, in accordance with the exemplary embodiments of this invention. In accordance with these exemplary embodiments a method performs, at block 710, instructions comprising an indication of signal characteristics of a locating signal from a first device (e.g., UE 210) are received. The locating signal from the first device is received at block 720. At block 730, locating signal information based at least in part on the received locating signal is determined. Additionally, the location may be determined at least in part on the signal characteristics (e.g., allocated time domain characteristics). The locating signal information is sent to a second device (e.g., LE 440) at block 740.

The various blocks shown in FIGS. 6 and 7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE) system, it should be appreciated that the exemplary embodiments of this invention are not limited for use with only this one particular type of wireless communication system, and that they may be used to advantage in other wireless communication systems such as for example (UTRAN, GSM, WCDMA, etc.).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., CQI, etc.) are not intended to be limiting in any respect, as these parameters may be identified by any suitable names. Further, the formulas and expressions that use these various parameters may differ from those expressly disclosed herein. Further, the various names assigned to different channels (e.g., PRACH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A user equipment (UE) comprising:
a receiver operable to receive a radio resource control (RRC) message including information indicating a semi-persistent scheduling (SPS) configuration for sounding reference signal (SRS) transmission;
the receiver operable to receive a transmission power command to set a transmission power level for SRS transmission; and
a transmitter operable to transmit a SRS transmission in time slots based on the SPS configuration information and using time, frequency, and code resources based on the received RRC message at a transmission power level based on the received transmission power command.

2. The UE of claim 1, wherein the transmitter is operable to boost a transmission power level of the SRS transmission relative to other transmissions by the UE based on the transmission power command to enable a plurality of network nodes to receive the SRS transmission so that a location determination unit can determine a location of the UE using an uplink time difference of arrival (U-TDOA) scheme.

3. The UE of claim 1, wherein the receiver is further operable to receive configuration information for a positioning signal to be used for positioning by the UE, the configuration information indicates orthogonal frequency division multiplex (OFDM) time and frequency resources for the positioning signal, and receive the positioning signal using the OFDM time and frequency resources.

4. The UE of claim 1, wherein the RRC message is a dedicated RRC signal.

5. The UE of claim 1, wherein the RRC signal is a broadcast RRC signal.

6. The UE of claim 1, wherein the transmitter is further operable to transmit a physical uplink shared channel (PUSCH) with a demodulation reference signal.

7. A method for use in a user equipment (UE), the method comprising:
   receiving a radio resource control (RRC) message including information indicating a semi-persistent scheduling (SPS) configuration for sounding reference signal (SRS) transmission;
   receiving a transmission power command to set a transmission power level for SRS transmission; and
   transmitting a SRS transmission in time slots based on the SPS configuration information and using time, frequency, and code resources based on the received RRC message at a transmission power level based on the received transmission power command.

8. The method of claim 7, wherein the transmission power level of the SRS transmission is boosted relative to other transmissions by the UE based on the transmission power command to enable a plurality of network nodes to receive the SRS transmission so that a location determination unit can determine a location of the UE using an uplink time difference of arrival (U-TDOA) scheme.

9. The method of claim 7, further comprising:
   receiving configuration information for a positioning signal to be used for positioning by the UE, the configuration information indicates orthogonal frequency division multiplex (OFDM) time and frequency resources for the positioning signal; and
   receiving the positioning signal using the OFDM time and frequency resources.

10. The method of claim 7, wherein the RRC message is a dedicated RRC signal.

11. The method of claim 7, wherein the RRC signal is a broadcast RRC signal.

12. The method of claim 7, further comprising:
    transmitting a physical uplink shared channel (PUSCH) with a demodulation reference signal.

13. A non-transitory computer readable medium storing a set of instructions that when executed by a user equipment (UE) cause the UE to:
    receive a radio resource control (RRC) message including information indicating a semi-persistent scheduling (SPS) configuration for sounding reference signal (SRS) transmission;
    receive a transmission power command to set a transmission power level for SRS transmission; and
    transmit a SRS transmission in time slots based on the SPS configuration information and using time, frequency, and code resources based on the received RRC message at a transmission power level based on the received transmission power command.

14. The non-transitory computer readable medium of claim 13, wherein the transmission power level of the SRS transmission is boosted relative to other transmissions by the UE based on the transmission power command to enable a plurality of network nodes to receive the SRS transmission so that a location determination unit can determine a location of the UE using an uplink time difference of arrival (U-TDOA) scheme.

15. The non-transitory computer readable medium of claim 13, wherein the set of instructions further cause the UE to:
    receive configuration information for a positioning signal to be used for positioning by the UE, the configuration information indicates orthogonal frequency division multiplex (OFDM) time and frequency resources for the positioning signal; and
    receive the positioning signal using the OFDM time and frequency resources.

16. The non-transitory computer readable medium of claim 13, wherein the RRC message is a dedicated RRC signal.

17. The non-transitory computer readable medium of claim 13, wherein the RRC signal is a broadcast RRC signal.

18. The non-transitory computer readable medium of claim 13, wherein the set of instructions further cause the UE to
    transmit a physical uplink shared channel (PUSCH) with a demodulation reference signal.

* * * * *